Dec. 24, 1963  W. R. STEWART  3,115,012
FLUID CONTROL MEANS
Filed Dec. 29, 1961  3 Sheets-Sheet 1

*INVENTOR.*
WILLIAM R. STEWART
BY *George J. Netter*
ATTORNEY

United States Patent Office 3,115,012
Patented Dec. 24, 1963

3,115,012
FLUID CONTROL MEANS
William R. Stewart, Vestal, N.Y., assignor to International Business Machines Corporation, New York, N.Y., a corporation of New York
Filed Dec. 29, 1961, Ser. No. 163,211
7 Claims. (Cl. 60—54.6)

The present invention pertains broadly to fluid control means, and in particular to such means for serially providing precalibrated amounts of fluid in response to digital information.

Increasing use is being made of digital computers as a basic decision-making device. This is true not only in the more exotic technological fields, such as the control of space craft for example, but also widespread application of computers is being made to industrial process control and in so-called automation equipment. In these cases the computer normally provides control information in the form of digital electric signals which are frequently in serial relation. An important requisite function, therefore, is the conversion of the electric signals into an appropriate useful work-performing form.

An important and advantageous class of apparatus for accomplishing this general function is that frequently referred to by the term "digital hydraulics." In the broader conceptual aspects, these apparatus rely upon utilizing the computer output signals to control special fluid valves for selectively channeling precalibrated amounts of fluid to an accumulator, which consequently provides a mechanical movement corresponding to the amount of fluid added to the accumulator. These controlled movements can be provided at relatively high repetition rates, in very precisely determined extents and of sufficient power to perform the end control function directly. And it is to this class of output apparatus that the present invention belongs, or more specifically to such powering apparatus for accommodating serial electric signals.

It is, therefore, one of the fundamental and primary objects of the invention to provide a fluid transferring means serially actuatable to provide individual discrete quantities of fluid.

A further object is the provision of such means capable of being actuated by a pulselike stimulus and in rapid succession.

A still further object is the provision of means for accomplishing the above objects which do not require resetting between consecutive fluid transferences.

The foregoing and other objects, features and advantages of the invention will be apparent from the following more particular description of a preferred embodiment of the invention, as illustrated in the accompanying drawings.

Briefly, the invention comprises an electrically actuated valve assembly of special construction interconnected in a fluid operated system for determining the amount of fluid to be supplied to the system. The valve assembly includes a first valve for interrelating a drive cylinder having a bidirectional spool with a solenoid actuated control valve. A third valve cooperatively joins the operation of the first and solenoid actuated valves for moving the drive spool in alternate directions on consecutive actuations. Each translation of the drive spool supplies a measured amount of fluid to the system.

FIGURES 3, a–e, illustrate diagrammatically the sequence of operations of the serial valve means through a complete cycle.

Figure 1:
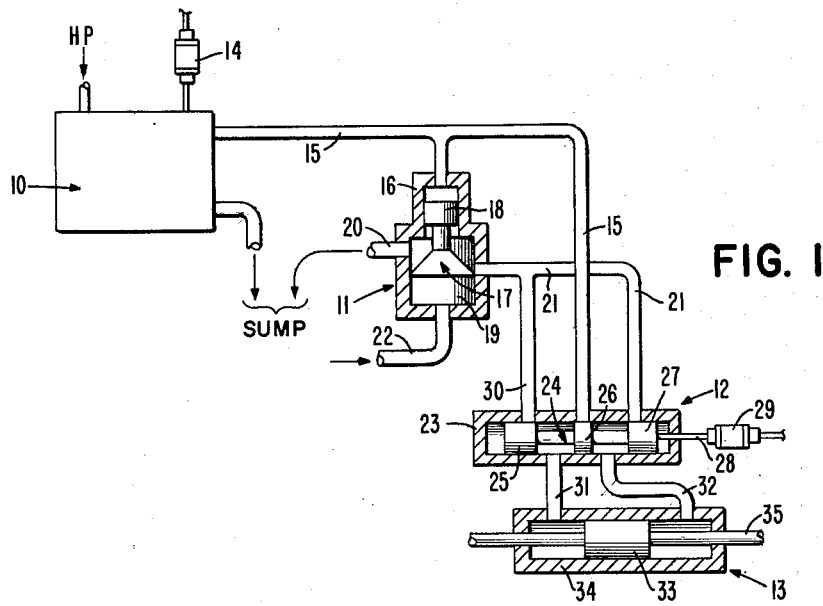
FIGURE 1 is a diagrammatic representation of a control system including the novel serial valve means of the invention.

Turning now particularly to FIGURE 1, there is shown a complete system for converting serially supplied electric signals into a corresponding physical movement or positioning, with which system the special valve means of the invention is integrally associated. In its major elements the system is seen to comprise a serial valve means or serial adder 10, a locking valve 11, a sign valve 12 and a ram or drive cylinder 13 operatively interconnected in a way that will be set forth at this time, such that each actuation cycle of the means 10 effects a controlled output movement of the cylinder 13.

Although the full detailed structure of the valve means 10 will be set forth later herein, for understanding the system operation it is only necessary to note now that the adder is provided with a high pressure fluid supply (H.P.) from a source (not shown), a sump connection and an electrical actuating means 14 which when energized actuates the valve means to supply a precalibrated quantity of fluid to a feed line 15.

The primary contemplation here is that the serial electric signals used to energize the solenoid 14 are derived from a digital computer. In this sense the system can be considered a digital-to-analog converter where electric signals existing in a coded form representative of a predetermined functional relationship to some quantity are directly converted into a physical change at a substantially increased power level.

The locking valve 11 includes a substantially cylindrical chamber 16 having an enclosed cavity of two parts, one of reduced cross sectional dimensions relative to the other. The interior of the chamber is placed in direct communication with the feed line 15 at the extremity of the cavity having the reduced cross section. A spool 17 is received within the cavity and has a first land 18 received within the portion of the cavity of reduced dimensions, and a second land 19 sealingly contained within the larger portion of the cavity. A sump connection 20 and a feed conduit 21 are in communication with the interior of the large portion of the chamber intermediate its extremities and at opposite sides. Similarly, a connection 22 to a source (not shown) of low pressure fluid is made at the extremity of the larger cavity.

The locking valve has two operative positions, corresponding to the conditions where the spool 17 is in its lowermost and uppermost extents of travel, respectively, as shown in FIGURE 1. At its lowermost position conduit 21 is open to the sump line 20, whereas at the uppermost position fluid in the conduit 21 (and subsequent portions of the system) is locked into a fixed pressure and statical translatory condition.

The sign valve 12 comprises a substantially cylindrical body chamber 23 containing a spool 24 with three lands 25–27 in fixed spaced relation on a common shaft 28, which lands are closely fit to the enclosing chamber. The shaft extends through an extremity of the chamber for connection to a double-acting sign solenoid 29. The conduit 21 and a branch 30 thereof are in communication with the interior of the chamber 23 at spaced points on one side while the feed line 15 is introduced at the same side intermediate these communication points. At the opposite side of the chamber there is provided a first, or ADD, exit line 31 and a second, or SUBTRACT, exit line 32.

With the solenoid 29 in a deenergized condition the lands 25–27 block branch 30, feed line 15 and conduit 21, respectively, from communication with the interior of the chamber 23. When energized to position the spool to the right, or in ADD relation, the feed line 15 is open to the ADD line 31 and simultaneously the SUBTRACT line 32 communicates with the line 21. On actuating the solenoid 29 to shift the spool 24 to its left or SUBTRACT position, feed line 15 interconnects with SUBTRACT line 32 while ADD line 31 at the same time opens into branch line 30.

The ram cylinder 13 consists of a drive spool 33 slidingly, but sealingly, received within a similarly dimensioned elongated chamber 34. Adjacent the extremities of the chamber are introduced the ADD and SUBTRACT lines 31 and 32, respectively. A drive shaft 35 fixedly secured to the spool 33 extends without the chamber for appropriate connection to a load.

Illustrative of the system operation, assume as initial conditions that the feed solenoid 14 has been impulsed once thereby actuating the valve means 10 to emit a single unit of pressurized fluid, and that the sign solenoid 29 has been set to the ADD condition, that is where the spool 24 is at its rightmost condition. The unit of pressurized fluid moves out and along the feed line 15 past the locking valve 11, through the sign valve 12 (now open) and along ADD line 31 for introduction into the left, or ADD, side of the ram cylinder 13.

The added unit quantity of fluid effects translation of the drive spool 33 toward the right (the plus or ADD direction) a corresponding amount forcing an identical amount of fluid out of the cylinder 34, along SUBTRACT line 32, through the sign valve 12, and via feed conduit 21 and the locking valve 11 to sump. Accordingly, the drive spool 33, drive shaft 35 and any load connected to the shaft are repositioned a discrete predetermined amount corresponding to the unit volume of fluid provided to the ram cylinder.

On completion of the fluid transference and repositioning of the ram spool the fluid pressure in the line 15 falls off from its initially high condition to a lower pressure not considerably different from sump. The low pressure fluid from the line 22 now exerts sufficient force against the spool 17 to move it into position such that the land 19 obstructs fluid flow from the line 21 to sump and the land 18 serves to define the limit of travel of the spool. This action serves to lock the fluid throughout the system stabilizing the position of the drive spool 33 until the valve means 10 is again impulsed to provide further additions of fluid to the drive cylinder.

The land 18 insures isolation of the sump and fluid units being transferred to the cylinder 13.

Deenergization of the sign valve can now be accomplished, returning the spool 24 to its neutral central location as shown in FIGURE 1, closing off feed line 15, feed conduit 21 and branch 30. Translation of the spool 24 does not affect the position of the drive spool 33 at this time since there is no pressure differential at the entrances of the ADD and SUBTRACT lines 31 and 32.

Figure 2:
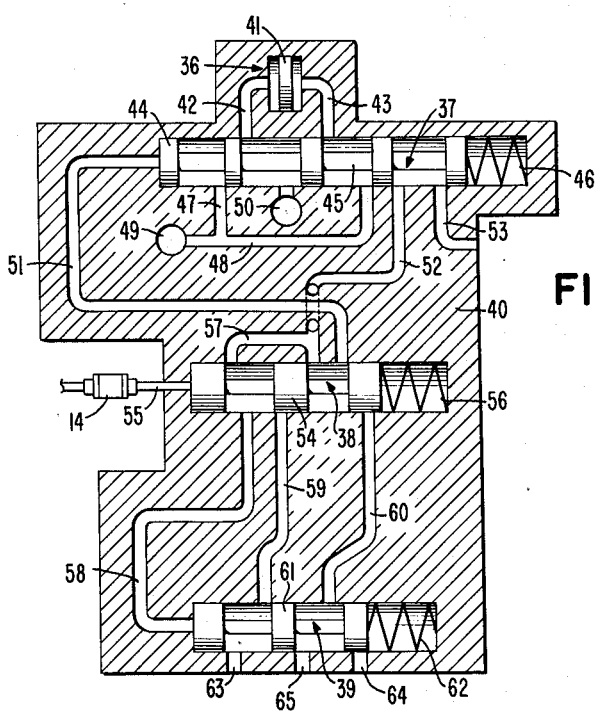
FIGURE 2 is a sectional view of the serial valve means of FIGURE 1.

The specific features of the novel valve means 10 are shown in sectional view in FIGURE 2. Broadly, it comprises a precalibrated volume cylinder 36, a drive valve 37, a solenoid actuated valve 38 and a memory valve 39 with appropriate conduit means interrelating the different component elements to a source of high pressure and a sump. Structurally, the various items composing the valve means 10 are shown embodied as a single unit, that is, included within a single base member 40; however, it is considered within the ambit of the invention to construct the valve means in separate parts with interconnections provided by more conventional individual fluid transferring lines or pipes.

The volume cylinder 36 consists of a cavity containing a shaftless spool 41 for longitudinal movement within the cavity and in close fitting fluid-sealing relationship to the walls defining the same. Hence, movement of the spool produces a corresponding transfer of fluid through openings in the extremities of the cavity and along lines 42 and 43.

The drive valve 37 comprises an elongated chamber including a spool 44 having five (5) lands arranged in fixed spaced relation on a common shaft 45. A compression spring 46 is situated at one extremity of the chamber engaging the rightmost end of the spool 44 as illustrated in FIG. 2, such that when in relaxed condition the spring exerts sufficient force to position the spool at its leftmost reach whereas dispositions of the spool away from the leftmost condition serve to place the spring further in compression. Lines 42 and 43 are in communication with the chamber of the valve 37 along one side thereof under control of appropriate lands of the spool 44. Spaced along the opposite side of the chamber are first and second fluid feed lines 47 and 48 connected to a source of supply of high pressure fluid 49. Intermediate connections of the lines 47 and 48 to the chamber is an exit line 50 which externally connects with the system feed line 15 of FIG. 1.

Additionally, the valve 37 is provided with a first control conduit 51 communicating with the free or non-spring end of the chamber, a second control conduit 52 connected to the chamber adjacent the spring carrying end and a sump line 53 immediately adjacent and beyond the line 52.

The solenoid actuated valve 38 includes an elongated cavity containing a three-land spool 54 for movement longitudinally thereof. One extremity of the spool 54 is provided with an actuating rod 55 extending outwardly from the cavity and base member 40 for operative connection to the solenoid 14. The other extremity of the spool 54 is in bearing engagement with a compression spring 56 which is also in force exerting relation to the corresponding facing end wall of the cavity. This defined physical relationship of the spring 56 to the spool 54 and the end wall is maintained irrespective of any particular positioning of the spool within the cavity.

It is sufficient at this time to note that energization of the solenoid 14 drives the spool against the spring 56 placing it in compression, whereas deenergization of the solenoid places the spool under the influence of the coiled spring which acts to effect controlled return translation of the spool to the position shown in FIG. 2.

Fluid in the second control conduit 52 is placed in open communication with the cavity of the valve 38 at a first point substantially midway between its extremities and via a branch line 57 at a second point spaced from the first point toward the solenoid 14 and on the same side of the cavity. The first control conduit 51 is introduced to the cavity beyond the point of connection of the second control conduit 52 toward the spring 56 and, again, on the same side of the cavity. Also, first, second and third memory lines 58–60 are arranged in separate fluid transmitting relation to the enclosed cavity opposite the other described connections.

Similarly, the memory valve 39 consists of a spool 61 having three lands secured in spaced relation on a common shaft, which spool is received within an appropriately dimensioned longitudinally extending enclosure. A coil spring 62 is interposed between and in engagement with both the rightmost end wall of the enclosure and corresponding end of the spool. The first memory line 58 connects into the opposite end wall of the enclosure, and the second and third memory lines 59, 60 separately communicate with the enclosure intermediate the end walls along one side thereof. Two sump connections are provided at 63 and 64 with a high pressure line 65 intermediately, with all three of these connections arranged along a side opposite that where memory lines 59, 60 are introduced to the enclosure.

Sequence of Operations

The relative positions of the different valves shown in FIG. 2 represents what might be termed a "return stroke" position, that is, when the solenoid 14 is in a deenergized state and spools 44, 54 and 61 are at their leftmost positions. The spool 41 is illustrated as substantially midway in its drive movement from right to left. Thus, high pressure fluid is available from line 48 through the drive valve 37 and line 43 to move the shaftless spool 41 against a relatively lower fluid pressure on the other side of spool. This movement effects transfer of fluid through line 42 and the valve 37 to the exit line 50 for utilization in the manner set forth in the description of the system of FIG. 1 given above. The high pressure fluid from line 65 is of passive effect now due to the obstructing relation of the spool 54 to the third memory line 60 and the locked condition of the included fluid in the first memory line 58 and beyond.

The spool 41 continues its leftward travel until reaching the limit and a full unit of fluid is transferred to the exit line 50, that is, a volume of fluid equal to that of the precalibrated amount of the cylinder 36. At this time the various elements of the valve means 10 retain the status shown in FIG. 3a until the solenoid 14 is actuated for a further fluid transfer cycle.

Figure 3A:
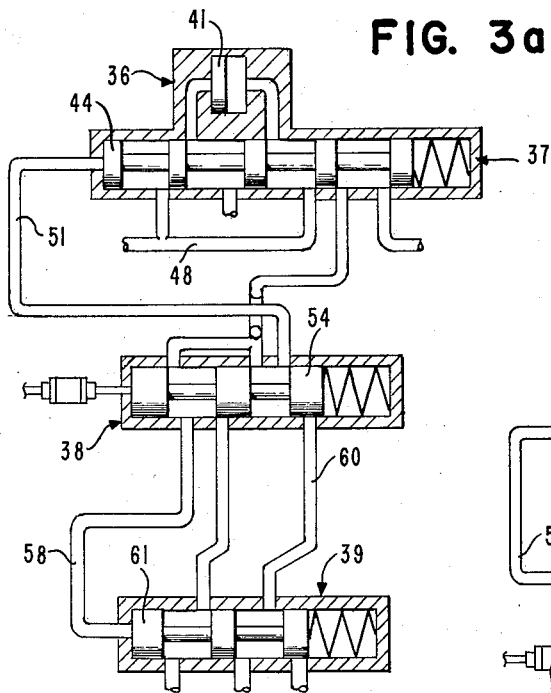
Figure 3B:
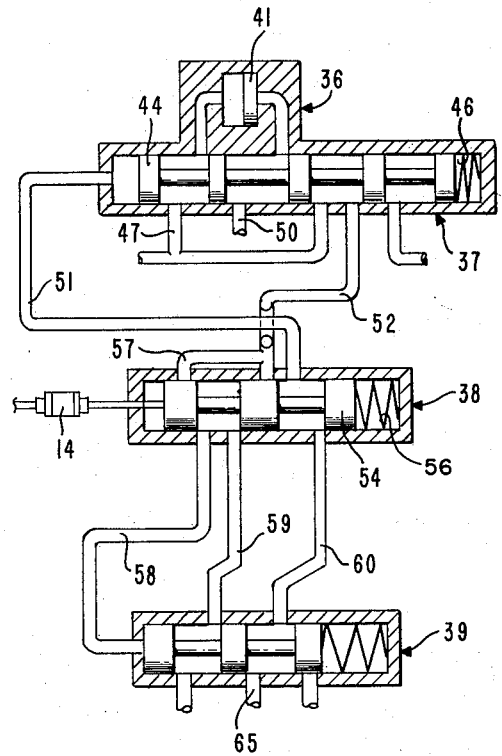

On subsequent energization of the solenoid 14 as in FIG. 3b, the spool 54 is driven to compress the spring 56, obstruct conduit 52 and line 57 with the appropriate lands and open line 60 to the chamber of the valve 38. High pressure fluid now moves from line 65 through memory valve 39, along line 60, via valve 38 and conduit 51 to exert a translation force on the extremity of the spool 44 moving it against the retarding force of spring 46. This movement opens a path for pressurized fluid from feed line 47 to drive spool 41 to its rightmost reach emptying a unit of fluid into the exit line 50.

Figure 3C:
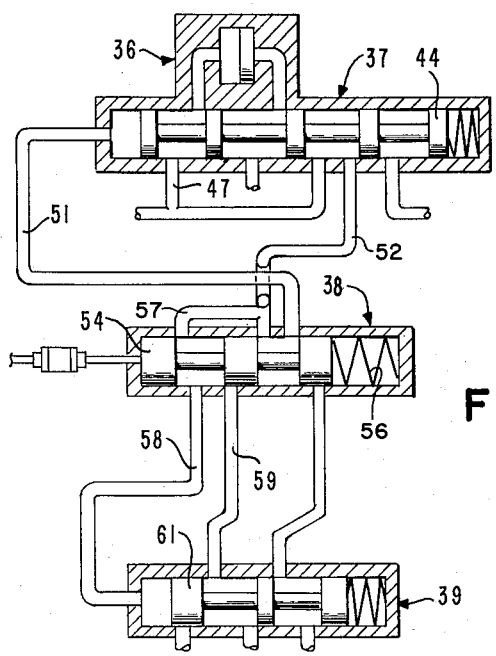

Deenergization of the solenoid 14 from the condition shown in FIG. 3b allows the coiled spring 56 to move the spool 54 to the leftmost as in FIG. 3c. This spring induced motion is possible since although conduits 51, 52 and line 57 are fluid-locked, there is an initial sump pressure path via second memory line 59 and immediately thereafter, when 59 is closed and 57, 58 are in mutual communication, high pressure fluid drives the spool 61 to its rightmost. This relationship (FIG. 3c) will be obtained due to a generalized fluid locking condition throughout. Thus, FIG. 3c, as FIG. 3a previously described, represents a static condition of the valve means 10 which continues until the solenoid 14 is provided with a further energization pulse.

Figure 3D:
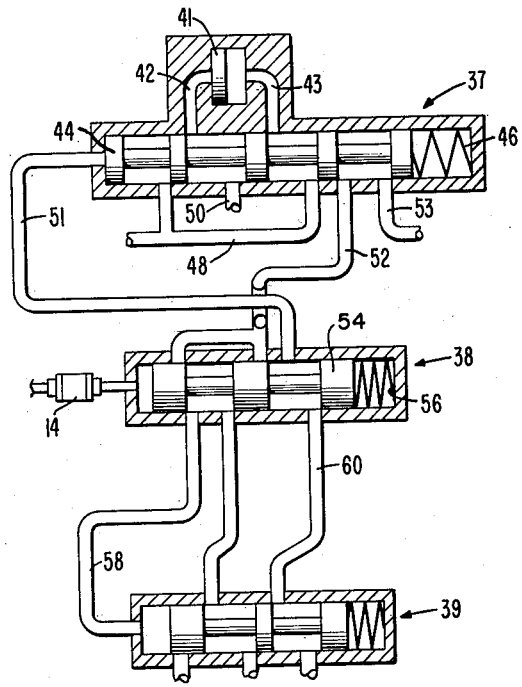
Figure 3E:
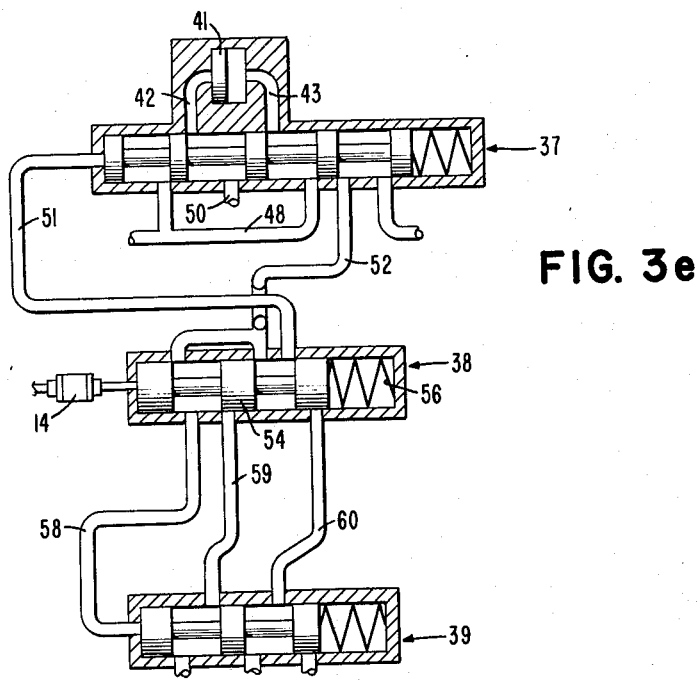

FIG. 3d represents the results of actuating the solenoid 14 when the valve means 10 is initially sitting in the condition of FIG. 3c. The spring 46 repositions the spool 44 to the left since at this time the line 51 relates through the valve 38, third memory line 60 and valve 39 to sump. Also, high pressure fluid passes from the second feed line 48, through valve 37 and line 43 to impel the spool 41 to its leftmost position (as in FIG. 3d) forcing a unit volume of fluid out line 42 to the exit line 50.

Relaxation of the solenoid 14 allows the spring impelled return of the spool 54 in the same manner as discussed above with respect to the transition of states represented sequentially by FIGS. 3b, c. This action brings the valve means 10 to the condition illustrated in FIG. 3e which is identical to that in FIG. 3a, or, in other words, the full cycle of operation is complete. Further impulsing of the solenoid 14, of course, merely initiates a repetition of the sequence of operations just described.

Although the advantages of the invention are not confined to a specific range of sizes and weights of the various valve spools, nor to certain kinds of fluids or magnitudes of fluid pressure, there is a necessary relation of these factors to the speed of operation. Since response time and rapidity of fluid transfer are prime objects here, some comments bearing on the theoretical aspects of the invention are in order.

The total time of operation of the serial adder 10 for a single unit transfer cycle can be assumed to consist of the sum of the times required for:

(a) The solenoid 14 to move the spool 54 to a position initiating movement of high pressure fluid through the valve 38;

(b) Fluid pressure via conduit 51, or the force of the coiled spring 46, to drive the spool 44 to one of its limits; and (c) Fluid driven by the spool 41 to move the drive spool 33 of the ram cylinder 13.

With respect to time (a), this in turn can be considered as the minimum sum of the valve acceleration time and the rise time for the solenoid current. For example, time (a) can be represented mathematically as follows:

$$T = A \ln\left[\frac{E\sqrt{F1}}{E\sqrt{F1} - RI\sqrt{F2}}\right] + \sqrt{\frac{2YM}{F3}}$$

where exemplary parameter values are:

$E$ = solenoid voltage, 24 v. D.C.
$F1$ = rated force of solenoid, 4.8 pounds
$R$ = resistance of solenoid, 15.5 ohms
$I$ = rated current of solenoid, 1.55 amps D.C.
$F2$ = developed force of solenoid, calculated 1.56 pounds for minimum time
$Y$ = solenoid valve stroke, 0.012 inch
$M$ = mass of spool 54, $7.55 \times 10^{-5}$ pounds-sec$^2$ per inch
$F3$ = acceleration force, 0.56 pound
$A$ = constant, $3.5 \times 10^{-3}$ seconds Using the above, the total response time for the solenoid valve was found to be 0.0047 second.

With respect to time (b), for a spool 44 having a diameter of 0.375 inch and 0.025 inch translation, fluid pressure equal to 250 pounds per square inch in excess of the retarding force of the spring 46 provides a response time of 0.002 second.

Time (c) in actual tests was found to be 0.020 second for a drive spool 41 of 0.500 inch diameter where fluid pressure of 500 pounds per square inch effected translation of the spool 0.407 inch.

A serial adder valve constructed as described above can provide precalibrated volumes of fluid to a remote location at rates as high as 30 cycles per second. Also, each bit of fluid so supplied has an associated pressure of sufficient magnitude to permit direct utilization for the performance of useful work.

While the invention has been particularly shown and described with reference to a preferred embodiment thereof, it will be understood by those skilled in the art that various changes in form and details may be made therein without departing from the spirit and scope of the invention.

What is claimed is:

1. A fluid control valve for providing discrete volumes of fluid, comprising:
   a precalibrated volume chamber having fluid conveying means connected therewith, said chamber including a spool in fluid impelling relation;
   a first valve having a plurality of orifices, certain of said orifices connected to a source of pressurized fluid and a feed line, and other of said orifices interconnected with the fluid conveying means of said volume chamber;
   a second valve having two fluid passing conditions;
   a third valve actuatable to pass fluid;
   actuating means operatively related to said third valve, said actuating means responsive to impulse stimuli; and
   fluid connecting lines interrlating said valves and said volume chamber whereby successive impulsing of said actuating means provides pressurized fluid to said volume chamber driving the included spool alternately in opposite directions impelling fluid on each drive into said feed line of volume equal to the volume of said precalibrated chamber.

2. A fluid control valve as in claim 1, in which said actuating means comprises a solenoid responsive to electric signals of pulselike character.

3. A fluid control valve as in claim 1, in which said first and second valves are positioned to a first state by fluid pressure and said third valve is set to a first state by the actuating means, and said valves are set to a second state by individual spring means, said spring means being placed in force-exerting condition by positioning to said first state.

4. A fluid control means for supplying substantially identical quantities of pressurized fluid in serial relation, comprising:
   a hollow cylinder of predetermined volume provided with an aperture at each end, and a shaftless spool received within said cylinder for bidirectional longitudinal movement therein driving fluid outwardly of the corresponding aperture;
   a first valve separately interconnecting a source of supply of pressurized fluid and the different apertures of the cylinder, said valve settable to two fluid passing conditions for driving the shaftless spool in each of its two possible modes of travel, respectively, said valve being further provided with a connnection to an exit feed line such that in each of said fluid passing conditions the fluid driven outwardly of said cylinder is connected to the exit feed line;
   a second valve provided with pressurized fluid and having two mutually exclusive fluid passing conditions, said valve being further provided with separate conduits for transmitting fluid along directions therein dependent upon the condition of said second valve; and
   a third valve interconnecting the conduits of said second valve and said first valve, said third valve being actuatable to pass the transmitted fluid from said second valve for setting said first valve to the other of its said conditions whereby the shaftless spool is driven alternately in opposite directions supplying a discrete volume of fluid to the exit feed line on each drive operation.

5. A fluid control means as in claim 4, in which means are provided operatively related to said third valve for actuating the same, said means being responsive to stimuli having relatively short time duration.

6. A fluid control means as in claim 5, in which said actuating means comprises an electrically responsive means energizable to actuating condition at a rate up to approximately 30 cycles per second.

7. In apparatus for transferring individual identical volumes of pressurized fluid to an accumulator cylinder serially in response to serially provided electric actuating signal pulses where the signal pulses and corresponding fluid transferences have a real-time relationship, the combination of:
   an elongated chamber of preassigned capacity;
   a spool received within said chamber for bidirectional movement along the long dimension of said chamber;
   first valve means actuatable to fluid passing condition;
   control valve means interrelating said chamber, said first valve means and said pressurized fluid for presenting said pressurized fluid in operative relation with different surfaces of said spool on successively adjacent actuations of said first valve means; and
   actuating means responsive to said electric signal pulses for actuating the first valve and effecting transference of a fluid volume to the accumulator cylinder for each electric signal pulse.

References Cited in the file of this patent
UNITED STATES PATENTS

| | | |
|---|---|---|
| 2,879,644 | Caslow et al. | Mar. 31, 1959 |
| 2,923,131 | Furman et al. | Feb. 2, 1960 |
| 3,001,369 | Allais et al. | Sept. 26, 1961 |